June 20, 1939.  H. F. HORNE ET AL  2,162,890

BEARING MATERIAL AND BEARING

Filed Aug. 24, 1935  2 Sheets-Sheet 1

WITNESSES:
E. A. McCloskey
Wm. C. Groome

INVENTORS
Harlan F. Horne and
Eugene B. Perry.
BY Ezra W. Savage
ATTORNEY

Patented June 20, 1939

2,162,890

UNITED STATES PATENT OFFICE 2,162,890

BEARING MATERIAL AND BEARING

Harlan F. Horne and Eugene R. Perry, Wilkinsburg, Pa., assignors to Westinghouse Electric & Manufacturing Company, East Pittsburgh, Pa., a corporation of Pennsylvania Application August 24, 1935, Serial No. 37,722

14 Claims. (Cl. 106—7.6)

The invention relates generally to bearing materials and bearings, and more particularly to composition bearing materials and bearings.

The object of the invention, generally stated, is to provide a bearing material having a low coefficient of friction and good wearing characteristics.

It is also an object of the invention to provide a bearing material which may be operated with only water lubrication.

For a better understanding of the nature and objects of the invention, reference may be had to the following detailed description, taken in conjunction with the accompanying drawings, in which.

Figure 1:
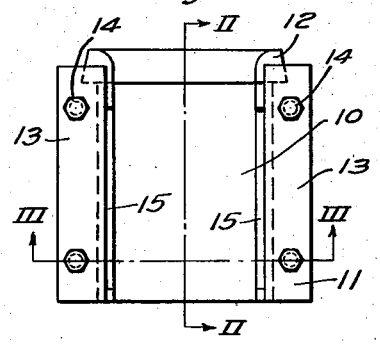
Fig. 1 is a view in top plan of a bearing made in accordance with the teachings of this invention.

With the advent of composition bearings into the steel industry, ship construction, electrical motor manufacture, etc., the life of the bearing has become an important factor in the economical operation of mills and other apparatus. It is with a view to lowering costs of production in mills that the present invention has been introduced.

A number of industries have accepted composition bearings because they give longer life than the standard metal bearings that had been employed for years. In the steel industry it has been found that when Micarta bearings are employed in rolling mills they have stood up satisfactorily for the rolling of as much as 40,000 tons of steel as compared with 900 tons of steel for metal bearings.

In the manufacture of our bearing material and bearings in the preferred form, we employ a fabric impregnated with some suitable resinous binder, such as a phenolic condensation product, mixed with a suitable mineral. Many minerals have been found satisfactory for mixing with the binder and we have used successfully the following: bentonite, whiting, rouge, rottenstone, flint, aluminum oxide, and talc.

When the fabric has been properly impregnated, a sufficient number of layers are superimposed on one another and molded under heat and pressure to produce a segment or bearing thrust block of the desired size and shape for the purpose for which it is to be employed. The temperatures and pressures employed in the molding operation will be substantially the same as are utilized in the manufacture of Micarta; that is, the bearing may be formed under a pressure of from about 1000 lbs. to 2000 pounds per square inch at a temperature of about 180° C.

The mineral utilized will depend to some extent on its cost and the facility with which it may be utilized in the manufacture of bearings and bearing thrust blocks. A number of satisfactory minerals are available and when utilized with the resinous binder enable the production of a bearing at a cost comparable with the composition bearings, for example, Micarta, now sold to the trade.

In selecting the mineral, its physical characteristics are of primary importance. One of the requisites of a suitable mineral is that there be no crystal cleavage plane. When the minerals do not have a crystal cleavage plane, they do not wear the member supported by the bearing.

Other features of importance in selecting a mineral is particle fineness, hardness and the facility with which it may be wetted. While the hardness is not a deciding physical characteristic, it must be given consideration. The wetting of the mineral when preparing the mixture of the resinous binder and mineral is of importance when impregnating the base material such as a fabric, chopped duck or other fibrous bases. A mineral, such as talc, is not readily wetted by the resinous binder and is not as suitable for making bearing materials and bearings as minerals such as bentonite and aluminum oxide. The minerals that are readily wetted facilitate the impregnating of the fabric or other fibrous base materials with a mixture of the binder and mineral and gives a composition in which the particles are all thoroughly bonded.

The amount of the mineral utilized in making the bearing materials will vary with the conditions to be met. Generally, in preparing the bearing materials, we will employ from 10% by weight to 30% by weight of the mineral. In steel mill bearings, we have obtained very excellent results by employing from about 18% by weight to 22% by weight of minerals such as bentonite and aluminum oxide.

Bearings made with these minerals have operated successfully for the rolling of as much as 70,000 tons of steel. When this is compared with 40,000 tons of steel for ordinary laminated Micarta bearings and 900 tons of steel for metal bearings, the value of the bearing material will be appreciated. When Micarta is employed in this specification we mean the composition of matter comprising a fibrous base impregnated with a resinous binder such as a phenolic, urea, vinyl or any of the other resins or resinous mixtures, all well known to the trade and sold by the Westinghouse Electric & Manufacturing Company under their trade mark "Micarta."

Figure 8:
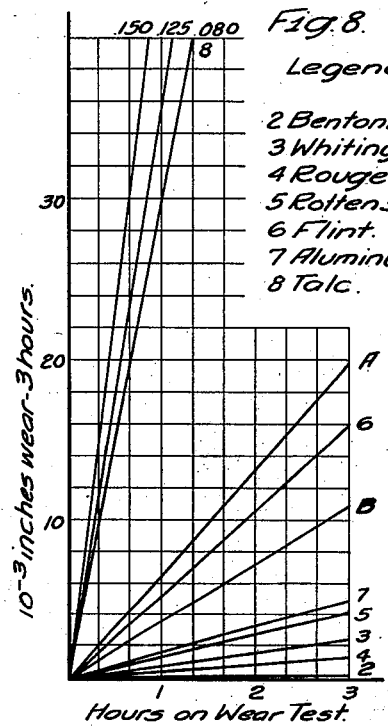
Fig. 8 is a graph showing wear in inches plotted on time for different minerals that may be employed in the bearing material.

Referring to Fig. 8 the graph shows that six of the minerals when embodied in the bearing improve its resistance to wear considerably over the laminated Micarta bearings that have been widely employed. The curves showing the amount of wear on laminated Micarta bearings are A and B. Curve 6, Fig. 8 for flint is between curves A and B showing that it was better than one Micarta bearing and not quite as good as the other. Curve 8, Fig. 8 shows that talc did not improve the wearing characteristics of the bearing, but this was probably because the mineral was not properly wetted in the mixing of it with the resinous binder. By employing a suitable wetting liquid when mixing the talc with the resinous binder, it could be used successfully.

Fig. 8 shows that when bentonite is employed that the wear in inches in the three hour test was almost nil, see curve 2. The wear on the bearing impregnated with rouge indicated by curve 4, whiting by curve 3, rottenstone by curve 5, aluminum oxide by curve 7 are all extremely low. Therefore, the adding of a mineral having predetermined physical characteristics greatly improves the capacity of the bearing to resist wear.

Figure 10:
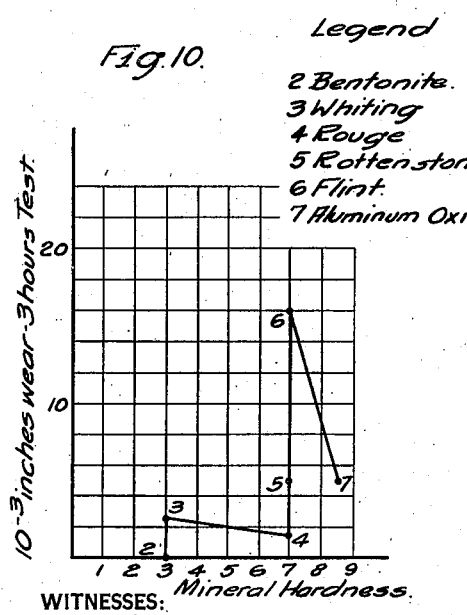
Fig. 10 is a graph showing wear in inches plotted on mineral hardness for minerals that may be utilized in making the bearing material.

The graph of Fig. 10 gives the relation of mineral hardness to the capacity of the final product to resist wear. The mineral hardness of bentonite is given by the point 2. It shows that it is not as hard as rouge, the hardness of which is designated by point 4, and yet a bearing carrying bentonite has greater resistance to wear. Whiting, the hardness of which is indicated by point 3, has about the same hardness as bentonite, and yet a bearing carrying whiting does not have as good wear resisting properties as a bearing carrying bentonite. The relation of mineral hardness for rottenstone and aluminum oxide to one another and to bentonite are given by the numerals 5, 6 and 7 respectively.

All the minerals employed had a small particle size ranging from 300 mesh to 25,000 mesh. In describing the particle size when it is desired to indicate a fineness between 300 mesh and 25,000 mesh or more, the expression "a fineness greater than 300 mesh" will be employed. The particle size or fineness was determined by microscopic examination.

Figure 9:
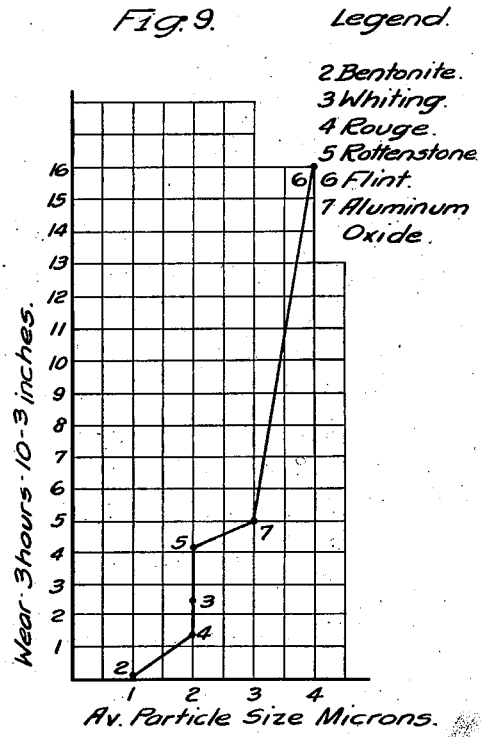
Fig. 9 is a graph showing wear in inches plotted on particle size for minerals that may be employed in making the bearing material.

Referring to Fig. 9, which shows wear in inches plotted on particle size in microns, it will be found that bentonite has the smallest particle size, being approximately 1 micron, as indicated at 2. The particle size of other satisfactory materials, such as whiting, rouge, rottenstone and aluminum oxide, are indicated by the numerals 3, 4, 5 and 7 respectively on the curve.

The average particle size of whiting, rouge and rottenstone is only slightly greater than bentonite. However, there is a considerable difference between the largest particle size of whiting, rouge and rottenstone and the largest particle size to be found in bentonite. This will be referred to hereinafter as the top particle size. Bentonite, because of the small top particle size, gives better results than the other materials.

Our experiments on particle size reveals that we may make the scientific generalization that good results can be obtained with a mineral having an average particle size of about 4 microns or less and a top particle size of less than about 40 microns. It is to be understood that in selecting a mineral, in addition to particle size the other physical features described hereinbefore, such as no crystal cleavage plane, hardness and capacity to be wetted during the mixing with the resinous binder must also be considered.

In the manufacture of bearing material and bearings, it has been found that materials of small particle size which have the other desired physical characteristics may be readily mixed with a resinous binder since it is easy to keep the mineral of small particle size in suspension. Materials, such as those listed hereinbefore, have been found practical in commercial use because of the ease with which they may be held in suspension.

Minerals which will have an abrasive action are objectionable, since, they will wear the moving member quite rapidly. Before selecting a mineral, it should be determined whether or not it will form an abrasive couple with tool steel.

The following table is a coordination of particle size, mineral hardness, Micarta hardness and bearing wear as found in a three hour test:

*Mineral filled bearing material*

| Mineral filler | Mineral hardness Moh's scale | Micarta hardness—V. P. N. | Particle size, microns, av.-top | Wear in 3 hrs.—$10^{-3}$ in. |
|---|---|---|---|---|
| Talc | 1–1.5 | 25 | 4–12 | 60 |
| Flint | 7 | 35 | 4–80 | 16 |
| Bentonite | Ca 3 | 32 | .01–2 | None |
| Andalusite | 7.5 | 24 | 2–30 | Cut shaft |
| Whiting | 3 | 32 | 2 | 2.5 |
| Rouge | 7 | 34 | 2–6 | 1.4 |
| Rottenstone | 7 | 35 | 2 | 4.2 |
| Aluminum oxide | 8–9 | 41.6 | 3–40 | 5 |

Figure 11:
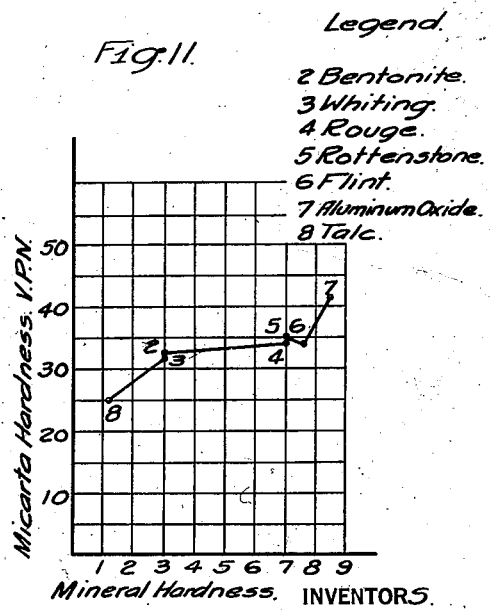
Fig. 11 is a graph showing the relation in hardness between the Micarta forming the base of the bearing and the minerals that may be employed in making the bearing material.

Since the minerals are embodied in suitable composition bearings, such as Micarta, which are well known to the trade, Fig. 11 has been included in the drawings to show the relation between Micarta hardness, that is the particular composition which we employed in our tests and the mineral hardness.

In Fig. 11, the mineral hardness as compared to the corresponding Micarta hardness is indicated by numerals which legends correspond to the numerals listed with the names of the minerals.

The foregoing description indicates that there are four factors to be considered in selecting a mineral for making bearing materials or bearings. These factors or qualities are, particle size, hardness, capacity to be wetted, and whether or not there is a plane of cleavage in the crystal structure. A mineral such as bentonite meets all these requirements, since it is sufficiently hard, has a small particle size, no plane of cleavage in its crystal structure, and may be readily wetted by the resinous binder. Minerals, such as rouge, rottenstone and whiting are also satisfactory, since they meet substantially the same standards as bentonite.

The graphs indicate that rouge, rottenstone, whiting and aluminum oxide are not quite as satisfactory as bentonite. This probably results from the fact that the top particle size of the minerals tested is somewhat greater than the top particle size of bentonite. If a finer grade of rouge, rottenstone, whiting and aluminum oxide having a smaller top particle size were utilized, then the results obtained would be comparable with bearings carrying bentonite.

The minerals bentonite, rouge, whiting, rottenstone, aluminum oxide, which meet the requirements of a satisfactory mineral to mix with a resinous binder to impregnate a fabric in the manufacture of bearing materials, are not adversely affected by the temperatures and pressures employed in the molding process. In the manufacture of bearing material, the usual practice is to employ any suitable fabrics, such as a duck, and impregnate it with a mixture of a resinous binder and the selected mineral held in suspension. However, any suitable base material which will carry the inorganic material or mineral may be employed. A very satisfactory bearing material and bearing can be made from chopped duck impregnated with a mixture of the resinous binder and mineral.

Bearings and bearing materials made in accordance with the teachings of this invention may be made in segments or cylinders. The usual practice in making bearings of this kind for heavy duty purposes is to make the bearings in segments and mount them in housings.

Figure 2:
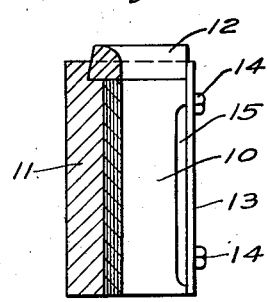
Fig. 2 is a view in section taken along the line II—II of Fig. 1 showing details of the structure.

Referring to Figs. 1 and 2, bearings suitable for heavy duty work, such as for steel mills, comprises a bearing segment or liner 10, which is made of the desired length, and extending through an arc of about 120°. The bearing is mounted in a housing 11 with a thrust block 12 disposed at one end thereof to receive the end thrust of a roll or shaft. The thrust block may be molded integral with the bearing or separately. Plates 13 are mounted on the housing by means of screw bolts 14 for retaining the bearing segment in position.

It is general practice to employ water lubrication with composition bearings of the kind disclosed herein. In this embodiment of the invention, in order to facilitate the introduction of the water between the bearing surfaces, chamfers are cut in the inner corner of the bearing segment as shown at 15. The water may be supplied in any suitable manner, as by means of a pipe leading from a source of water supply and disposed to cause the water to flow into the chamfers. Apparatus for supplying water is not shown since it is well known in the art.

Figure 4:
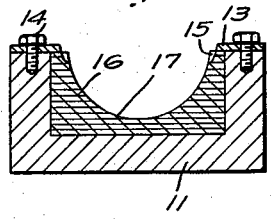
Fig. 4 is a view in section showing another embodiment of the invention.

Referring to the embodiment of the invention illustrated in Fig. 4, a laminated block 16 carrying the proper proportion of mineral is first molded and then machined to provide the desired bearing surface 17. As illustrated the block is machined to receive a shaft. After the bearing is machined, it is mounted in a housing 11 in the same manner as the bearing disclosed in Figs. 1 and 2.

Figure 5:
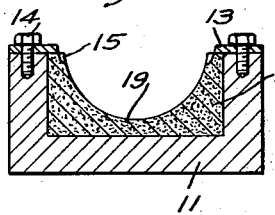
Fig. 5 is a view in transverse section of a bearing made utilizing a chopped fabric as the base fibrous material.
Figure 3:
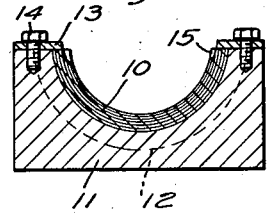
Fig. 3 is a view in section taken on the line III—III of Fig. 1 showing details of the preferred form of the bearing.

Referring to Fig. 5, a bearing block 18 made from chopped duck or any other suitable fibrous material is illustrated as molded or machined to give a desired bearing surface 19. The manner of mounting the bearing element will be similar to that described for the structure illustrated in Figs. 3 and 4. Water lubrication may be supplied to the bearings in any well known manner.

It has been found that these bearings are highly satisfactory for many uses. For example, recent tests have shown that they are suitable for small motors such as are employed for operating domestic appliances, farm machinery and for many other purposes where similar duties are imposed on the bearings. In such cases, the bearing or liner may be either molded in segments, or, as illustrated in Figs. 6 and 7, in cylindrical form.

We have obtained good results by winding a fabric, impregnated with our mineral carrying resinous binder, on a mandrel and heat treating it in an oven without using pressure. Of course, such a bearing may also be molded by applying heat and pressure.

Figure 6:
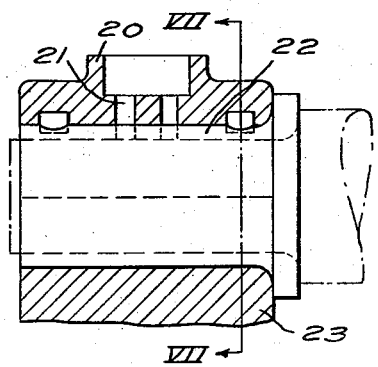
Fig. 6 is a view in longitudinal section of a 360° bearing made in accordance with this invention.
Figure 7:
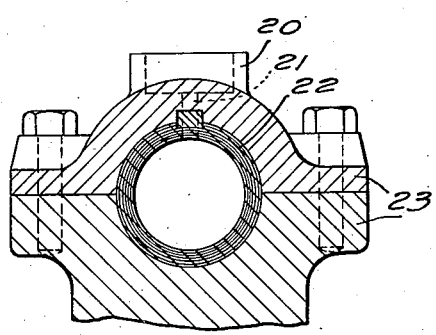
Fig. 7 is a view in section taken along the line VII—VII of Fig. 6.

It has been found, when using bearings of the type shown in Figs. 6 and 7, that oil lubrication is beneficial. Accordingly, any suitable means may be provided for supplying oil lubrication.

In Figs. 6 and 7, oil cups 20 are provided with channels 21 leading to the inner surface of the bearing 22. The provision of the oil cups and the grooves which lead to the bearing surfaces are generally sufficient, but oil grooves may be provided in the inner face of the bearings. The mounting of cylindrical bearings may be taken care of in any usual manner as providing split housings 23.

Since certain changes may be made in the above product and article and different embodiments of the invention can be made without departing from the scope thereof, it is intended that all matter contained in the above description or shown in the accompanying drawings shall be interpreted as illustrative and not in a limiting sense.

We claim as our invention:

1. A bearing material comprising, in combination, a base material impregnated with a resinous binder and an inorganic mineral having no crystal cleavage plane and being of a particle size small enough for mixing with the resinous binder for impregnating the base material employed.

2. A bearing material comprising, in combination, a fibrous base mineral impregnated with a resinous binder and carrying a quantity of inorganic material, the inorganic mineral having no crystal cleavage plane and being of a particle size small enough to facilitate mixing with the resinous binder and the impregnation of the fibrous base material.

3. A bearing material comprising a fibrous base material impregnated with a mixture of a resinous binder and an inorganic mineral having no crystal cleavage plane and being made up of particles small enough in size to facilitate mixing with the resinous binder and the impregnation of the fibrous base material.

4. A bearing material comprising a fibrous base material impregnated with a resinous binder and carrying an inorganic mineral having no crystal cleavage plane and a particle size of about 300 mesh or finer.

5. A bearing material comprising, in combination, a fabric impregnated with a resinous binder and a mineral having no crystal cleavage plane and a particle size of about 300 mesh or finer.

6. A bearing for moving members comprising a bearing member composed of a fabric impregnated with a resinous binder and carrying a mineral having no crystal cleavage plane and being of a particle size small enough to facilitate mixing with the resinous binder and the impregnation of the fabric employed.

7. A bearing material comprising a fabric base impregnated with a resinous binder carrying a mineral, the mineral having no crystal cleavage plane and being made up of particles small enough in size to enable mixing with the resinous binder and the impregnation of the fabric base.

8. A bearing material comprising, in combination, a fabric impregnated with a resinous binder and one of the group of minerals including bentonite, rouge, whiting, aluminum oxide, rottenstone, and flint.

9. A bearing material comprising, in combination, a fabric impregnated with a resinous binder mixed with one or more of the group of minerals including bentonite, rouge, whiting, aluminum oxide, rottenstone, and flint.

10. A bearing material comprising, in combination, a fabric impregnated with a resinous binder and containing a quantity of the mineral, bentonite.

11. A bearing liner comprising a fabric impregnated with a resinous binder which has mixed therewith a mineral selected from the group consisting of bentonite, rouge, whiting, aluminum oxide, rottenstone, and flint.

12. A bearing liner comprising a fabric impregnated with a resinous binder having mixed therewith aluminum oxide, the impregnated fabric being shaped to present a bearing face to meet operating conditions.

13. A bearing comprising a fibrous base impregnated with a resinous binder, and the mineral aluminum oxide in a finely divided state and of a particle size small enough to facilitate the impregnation of the fibrous base, the whole being treated under heat and pressure.

14. A bearing liner of predetermined shape comprising a fibrous material impregnated with a resinous binder, and a mineral having no crystal cleavage plane and being of a particle size small enough to facilitate the impregnation of the fabric employed, the whole being treated under heat and pressure.

HARLAN F. HORNE.
EUGENE R. PERRY.